United States Patent Office 3,201,483
Patented Aug. 17, 1965

3,201,483
METHOD OF FLUORINATING WITH ANTIMONY PENTAFLUORIDE
Ralph A. Davis, Midland, Mich., assignor to The Dow Chemical Company, Midland, Mich., a corporation of Delaware
No Drawing. Filed Aug. 22, 1962, Ser. No. 218,532
6 Claims. (Cl. 260—653.8)

This invention relates to a novel process in which antimony pentafluoride is used to selectively fluorinate bromine-containing organic compounds.

Antimony pentafluoride has been proposed in the past as a fluorinating agent. However, its use to fluorinate organic bromine compounds which are normally difficult to fluorinate usually resulted in a large amount of decomposition and dehydrohalogenation of the organic compounds. Attempts at fluorination of normally easily fluorinated organic compounds by means of antimony pentafluoride usually resulted in highly exothermic reactions giving perfluorinated products. It was also generally noted, that the salts formed in the fluorination reaction became practically solid after about one fluorine atom per mole of antimony fluoride has been used. Solidification of the salts tended to cause a loss of control of the reaction and made regeneration of the fluorinating agent virually impossible. Neither hydrogen fluoride nor fluorine could accomplish significant regeneration.

It is an object of the present invention to provide a process in which antimony pentafluoride may be used in an easily controllable manner to selectively fluorinate bromine containing organic compounds.

It is a further object of the present invention to provide a process in which the spent antimony fluoride fluorinating agent may be easily regenerated.

It has now been discovered that when antimony pentafluoride is mixed with bromine, fluorination of organic materials may be carried out with a high degree of controllability. It has also been discovered that when the process of the present invention is used bromine is selectively replaced from the organic molecule by fluorine from the fluorinating agent.

It has been further discovered that when the fluorination process is carried out in bromine to maintain reactants and products in a liquid form, the fluorinating agent may be regenerated in situ through the use of such regeneration agents as fluorine, bromine trifluoride, bromine pentafluoride, chlorine trifluoride, iodine pentafluoride, and the like.

The process of the present invention may be practiced by mixing a desired amount of antimony pentafluoride with bromine and placing the liquid mixture in a suitable reaction vessel. To the vessel may then be added the organic compound containing bromine, the reaction usually occurring immediately thereby to replace at least one bromine atom on the organic molecule with fluorine.

Bromine is desirably added to the antimony pentafluoride in an amount sufficient to permit reaction temperature control and to maintain reactants in the fluid state or at least in a fluid suspension throughout reaction. Usually bromine in an amount by weight of about ¼ to about 4 times as much as the antimony pentafluoride used is adequate.

Antimony pentafluoride is used in any amount which may be convenient when taking into account the reactor size and the amount of organic material to be fluorinated. Usually at least one mole of antimony pentafluoride should be present for each atom of bromine on the organic molecule which is to be replaced by fluorine. If less antimony pentafluoride than one mole per bromine atom to be replaced is used large quantities of solids may settle out, interfering with stirring of the reaction mixture and causing consequent difficulties in temperature control.

Reaction vessels suitable for use in the present invention should be constructed of materials which are inert to the reactants and the products of the present invention. Monel vessels have been found to be suitable but any vessel having the necessary inertness is appropriate. The size of the reactor is dependent upon the amount of product desired and on the temperature control necessary to obtain the desired product in the desirable yield.

Appropriate starting materials for the present invention are hydrocarbons containing from two and to four carbon atoms, at least one bromine atom, and at least one hydrogen atom. Preferred starting materials are ethanes containing at least two fluorine atoms, at least two bromine atoms, and at least one hydrogen atom. It is desirable that both fluorine atoms are on the same carbon atom. Examples of such preferred starting materials are $CF_3$—$CHBr_2$ and $CBrF_2$—$CHBr_2$.

Reaction is usually carried out at a temperature of from about 20° centigrade to about 70° centigrade. The reaction temperature is generally limited by the boiling point of bromine unless pressure is used. However, too high a pressure may cause over-fluorination of some of the organic materials. Therefore, atmospheric pressure is generally used except with low boiling compounds where pressure may be necessary in order to maintain the reactants or intermediate products liquid and in the reaction zone.

The products of the present invention are hydrocarbons containing from two to four carbon atoms and containing at least one fluorine atom. Preferred products of the present invention are those which contain two carbon atoms, at least one hydrogen atom, at least one bromine atom, and at least three fluorine atoms. Such products are useful as anesthetics, aerosol propellants, blowing agents for foaming plastic materials, and the like.

Regeneration of the antimony pentafluoride may be carried out in the same vessel, if desired. Usually, regeneration is begun by adding to the spent antimony fluoride-bromine mixture an amount of regenerating agent such that for each fluorine atom to be placed on the antimony an equal number of atoms of fluorine will appear on each mole of the regenerating agent.

Suitable regenerating agents for use in the present invention are fluorine, bromine trifluoride, bromine pentafluoride, chlorine trifluoride, iodine pentafluoride, and the like.

Regeneration is usually run at a temperature of from about 0° centigrade to about 50° centigrade at atmospheric pressure. If the regeneration is run at too low a temperature there is a danger of accumulating unreacted halogen fluoride which may react violently upon warming of the mixture. Too high a temperature will usually cause a wasteful loss of bromine from the reaction mixture.

The process of the present invention may be more easily understood in light of the following examples which are set forth to illustrate but are not to be construed to limit the present invention.

*Example 1*

To a one liter Monel flask equipped with a stirrer, a nickel reflux condenser and a nickel dropping funnel were added about .4 mole antimony pentafluoride and about 350 grams of bromine. The mixture was kept at room temperature and $CF_3CHBr_2$ was added slowly until finally 100 grams or 0.41 mole had been added to the reaction vessel. The reaction was slightly exothermic at first and then slowed down. After all the organic had been added the reaction mixture was heated until bromine refluxed on the condenser. At the end of one hour the reaction was essentially complete and the condenser was allowed to warm to about 35 to 40 degrees centigrade in order to permit all the products to distill from the bromine reflux. The collected product was scrubbed through a 10 percent sodium hydroxide solution in order to remove any free bromine. Seventy two grams of crude product were recovered and analyzed by vapor phase chromatography and found to contain about 97.7 mole percent $CF_3CHBrF$ 1.5 percent $CF_3CHF_2$, and an unknown material, probably $CF_3CH_2F$, in an amount of about 0.8 percent. The recovery of organic material was about 97 percent.

*Example 2*

Using substantially the same procedure as that shown in Example 1, 0.33 mole of $CF_2BrCHBr_2$ was fluorinated using antimony pentafluoride in bromine. Recovery of 98 mole percent of the organic charged was made. Product analysis showed that 99.2 percent of the product was $CF_3CHBrF$, the remainder being $CF_3CHF_2$.

*Example 3*

In order to illustrate the usefulness of this invention a comparison experiment was carried out in which no bromine was used with the antimony pentafluoride. Two hundred fifty-one (251) grams of antimony pentafluoride were charged to a 1 liter Monel flask equipped with a reflux condenser and a dropping funnel. Two hundred ninety-five (295) grams of $CHBr_2CF_3$ were added slowly and with stirring. At first the reaction was violent and quite exothermic. During this period $CF_3CHF_2$ appeared to be formed. Later the exothermic character of the reaction quieted down and the reaction mixture was heated to about 70 degrees as the reaction proceeded. One hundred forty-eight (148) grams of fluorinated product were recovered. Analysis of the product by mass spectroscopy showed the following composition: $CHBrFCF_3$ 60 mole percent, $CHF_2CF_3$ 37.6 percent, carbon dioxide 2.4 percent. This example illustrates the difficulty in controlling fluorination to the degree desired when bromine is not incorporated in the process. Almost 40 percent of the product is composed of pentafluoroethane.

*Example 4*

To the spent salts of a previously run fluorination reaction containing roughly 1 mole of antimony trifluoride or its equivalent were added 95 grams, or 0.69 mole, of bromine trifluoride. Bromine trifluoride was added slowly with stirring and ice water cooling of the reaction vessel. After reaction was complete the mixture contained about one mole of antimony pentafluoride and was ready for use in fluorinating bromine containing ethanes in accordance with the process of the present invention.

*Example 5*

In substantially the same manner described in Example 4, spent antimony fluoride fluorinating agent may be regenerated by the use of chlorine trifluoride. To a liquid mixture of bromine and spent antimony fluoride fluorinating agent containing roughly 1 mole of antimony trifluoride or its equivalent were added 21 grams or about 0.228 moles of chlorine trifluoride. The addition was made slowly over a period of about 30 minutes. During the addition the reaction mixture was stirred and cooled with external ice water. The regeneration product mixture thus formed was used as a fluorinating agent and gave results equivalent to the results obtained with antimony pentafluoride in bromine. Thus, it was presumed that antimony pentafluoride had been regenerated.

*Example 6*

In substantially the same manner as Examples 4 and 5 spent antimony fluoride fluorinating agent in bromine may be regenerated by reaction with fluorine, bromine pentafluoride, iodine pentafluoride, or the like. The regeneration product mixture of bromine and antimony pentafluoride is useful as a fluorinating agent which selectively replaces bromine on an organic molecule to the desired degree of fluorination.

Various modifications may be made in the present invention without departing from the spirit or scope thereof and it is to be understood that I limit myself only as defined in the appended claims.

I claim:

1. A process for the fluorination of straight chain, saturated hydrocarbons having from two to four carbon atoms and containing at least one bromine atom, comprising reacting said hydrocarbon, at a temperature of from about 20 to about 70 degrees centigrade, and at a pressure sufficient to maintain the reactants liquid, with a mixture containing antimony pentafluoride and from about one-fourth to about four times its weight of bromine, said mixture being further characterized in that the bromine is present in an amount sufficient to maintain said antimony pentafluoride and the antimony salts formed in the reaction in a liquid suspension thereby to selectively replace at least one bromine on said hydrocarbon with fluorine, and separating fluorinated hydrocarbon product from the reaction mixture thus formed.

2. A process for the fluorination of 2,2-di-bromo 1,1,1-trifluoroethane comprising, reacting 2,2-dibromo 1,1,1-trifluoroethane at a temperature of from about 20 to about 70 degree centigrade, and at a pressure sufficient to maintain the reactants liquid, with an antimony pentafluoride-bromine mixture containing from about one-fourth to about four times as much bromine as antimony pentafluoride by weight, said mixture being further characterized in that the bromine is present in an amount sufficient to maintain said antimony pentafluoride and the antimony salts formed in the reaction in a liquid suspension thereby to selectively replace bromine on said ethane with fluorine, and separating 2-bromo 1,1,1,2-tetrafluoroethane product from the reaction mixture thus formed.

3. A process for the fluorination of 1,2,2-tribromo 1,1-difluoroethane comprising, reacting 1,2,2-tribromo 1,1-difluoroethane, at a temperature of from about 20 to about 70 degrees centigrade, and at a pressure sufficient to maintain the reactants liquid, with an antimony pentafluoride-bromine mixture containing from about one-fourth to about four times as much bromine as antimony pentafluoride by weight, said mixture being further characterized in that the bromine is present in an amount sufficient to maintain said antimony pentafluoride and the antimony salts formed in the reaction in a liquid suspension thereby to selectively replace bromine on said ethane with fluorine, and separating 2-bromo 1,1,1,2-tetrafluoroethane product from the reaction mixture thus formed.

4. A process for the fluorination of straight chain, saturated hydrocarbons having from two to four carbon atoms and containing at least one bromine atom comprising, reacting said hydrocarbon, at a temperature of from about 20 to about 70 degrees centigrade, and at a pressure sufficient to maintain the reactants liquid, with a mixture of antimony pentafluoride and bromine, said bromine being present in an amount sufficient to maintain said antimony pentafluoride and the antimony salts formed in the reaction in a liquid suspension, thereby to selectively replace at least one bromine on said hydrocarbon with fluorine, separating fluorinated hydrocarbon product from the reaction mixture, and treating the liquid suspension of spent antimony salts with bromine trifluoride, thereby regenerating said antimony pentafluoride for use as a fluorinating agent.

5. A process for the fluorination of straight chain, saturated hydrocarbons having from two to four carbon atoms and containing at least one bromine atom comprising, reacting said hydrocarbon, at a temperature of from about 20 to about 70 degrees centigrade, and at a pressure sufficient to maintain the reactants liquid, with a mixture of antimony pentafluoride and bromine, said bromine being present in an amount sufficient to maintain said antimony pentafluoride and the antimony salts formed in the reaction in a liquid suspension, thereby to selectively replace at least one bromine on said hydrocarbon with fluorine, separating fluorinated hydrocarbon product from the reaction mixture, and treating the liquid suspension of spent antimony salts with chlorine trifluoride, thereby regenerating said antimony pentafluoride for use as a fluorinating agent.

6. A process for the fluorination of straight chain, saturated hydrocarbons having from two to four carbon atoms and containing at least one bromine atom comprising, reacting said hydrocarbon, at a temperature of from about 20 to about 70 degrees centigrade, and at a pressure sufficient to maintain the reactants liquid, with a mixture of antimony pentafluoride and bromine, said bromine being present in an amount sufficient to maintain said antimony pentafluoride and the antimony salts formed in the reaction in a liquid suspension, thereby to selectively replace at least one bromine on said hydrocarbon with fluorine, separating fluorinated hydrocarbon product from the reaction mixture, and treating the liquid suspension of spent antimony salts with fluorine, thereby regenerating said antimony pentafluoride for use as a fluorinating agent.

References Cited by the Examiner
UNITED STATES PATENTS

| | | | |
|---|---|---|---|
| 2,423,045 | 6/47 | Passino et al. | 260—653 |
| 2,531,372 | 11/50 | Waterman et al. | 260—653 |
| 2,875,253 | 2/59 | Barnhart | 260—653 |

JOSEPH R. LIBERMAN, *Primary Examiner.*

DANIEL D. HORWITZ, LEON ZITVER, *Examiners.*